US008856448B2

(12) United States Patent
Morrow et al.

(10) Patent No.: US 8,856,448 B2
(45) Date of Patent: Oct. 7, 2014

(54) METHODS AND APPARATUS FOR LOW INTRUSION SNOOP INVALIDATION

(75) Inventors: Michael W. Morrow, Cary, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 860 days.

(21) Appl. No.: 12/388,545

(22) Filed: Feb. 19, 2009

(65) Prior Publication Data

US 2010/0211744 A1    Aug. 19, 2010

(51) Int. Cl.
*G06F 12/00* (2006.01)
*G06F 12/08* (2006.01)

(52) U.S. Cl.
CPC ........ *G06F 12/0831* (2013.01); *G06F 12/0808* (2013.01)
USPC .... 711/128; 711/141; 711/146; 711/E12.018; 711/E12.022; 711/E12.026; 711/E12.033

(58) Field of Classification Search
USPC .......................................... 711/128, 141, 146
See application file for complete search history.

(56) References Cited

U.S. PATENT DOCUMENTS

| | | | | | |
|---|---|---|---|---|---|
| 4,168,541 | A | * | 9/1979 | DeKarske | 365/49.17 |
| 5,319,768 | A | * | 6/1994 | Rastegar | 711/131 |
| 5,513,335 | A | * | 4/1996 | McClure | 711/130 |
| 5,813,028 | A | * | 9/1998 | Agarwala et al. | 711/118 |
| 6,119,204 | A | * | 9/2000 | Chang et al. | 711/141 |
| 6,973,548 | B1 | | 12/2005 | Vartti et al. | |
| 7,028,144 | B2 | * | 4/2006 | Auld et al. | 711/144 |
| 7,346,735 | B2 | * | 3/2008 | Peri et al. | 711/118 |
| 2007/0113232 | A1 | * | 5/2007 | Collard et al. | 718/101 |
| 2009/0037666 | A1 | * | 2/2009 | Rahman et al. | 711/143 |
| 2009/0276579 | A1 | * | 11/2009 | Moyer | 711/141 |
| 2010/0205377 | A1 | * | 8/2010 | Moyer | 711/146 |

FOREIGN PATENT DOCUMENTS

EP            0309995 A2    4/1989

OTHER PUBLICATIONS

International Search Report & Written Opinion—PCT/US2010/024693—International Search Authority—European Patent Office—May 26, 2010.

(Continued)

*Primary Examiner* — Aracelis Ruiz
(74) *Attorney, Agent, or Firm* — Peter Michael Kamarchik; Nicholas J. Pauley; Joseph Agusta

(57) ABSTRACT

Efficient techniques are described for tracking a potential invalidation of a data cache entry in a data cache for which coherency is required. Coherency information is received that indicates a potential invalidation of a data cache entry. The coherency information in association with the data cache entry is retained to track the potential invalidation to the data cache entry. The retained coherency information is kept separate from state bits that are utilized in cache access operations. An invalidate bit, associated with a data cache entry, may be utilized to represents a potential invalidation of the data cache entry. The invalidate bit is set in response to the coherency information, to track the potential invalidation of the data cache entry. A valid bit associated with the data cache entry is set in response to the active invalidate bit and a memory synchronization command. The set invalidate bit is cleared after the valid bit has been cleared.

20 Claims, 8 Drawing Sheets

(56) References Cited

OTHER PUBLICATIONS

Lee Yongjoon: "Laziest write posting on bus-based SMPs" 2000 Canadian Conference on Electrical and Computer Engineering. Conference Proceedings. Navigating to a New Era. Halifax, NS, Canada, Mar. 7-10, 2000, Jan. 1, 2000, pp. 21-25, XP002581792 Piscataway, NJ, USA ISBN: 0/7803-5957-7 abstract p. 21, left-hand column, line 1—p. 23, right-hand column, line 22.

Michel Dubois et al: "Delayed consistency and its effects on the miss rate of parallel programs" Supercomputing, 1991. Supercomputing "91. Proceedings of the 1991 ACM/IEEE Conference on, IEEE, Piscataway, NJ, USA, Nov. 18, 1991, pp. 197-206, XP031577284 ISBN: 978-0-89791-459-8 abstract p. 197, right-hand column, Line 19, p. 198, left-hand column, 1 ine 15 page 200, left-hand column, 1 ine 10—page 201, right-hand column, 1 i ne 1 page 202, right-hand column, line 39 - ". page 203, left-hand column, 1 i ne 24 figure 1.
Taiwan Search Report—TW099105034—TIPO—May 7, 2013.

* cited by examiner

METHODS AND APPARATUS FOR LOW INTRUSION SNOOP INVALIDATION

FIELD OF THE DISCLOSURE

The present disclosure relates generally to the field of memory consistency in processing systems, and more specifically, to improvements relating to cache coherency protocols.

BACKGROUND

Many portable products, such as cell phones, laptop computers, personal data assistants (PDAs) and the like, utilize a processing system that executes programs, such as, communication and multimedia programs. A processing system for such products may include multiple processors, memory for storing instructions and data, controllers, peripheral devices, such as communication interfaces, and fixed function logic blocks configured, for example, on a single chip. At the same time, portable products have a limited energy source in the form of batteries that are often required to support high performance operations from the processing system. To increase battery life, when possible, it is desired to perform these operations at reduced power levels. Many personal computers are also being developed to support high performance operations at low power drain to reduce overall energy consumption.

Processors are added to a processing system to improve performance, but the multiple processors and peripheral devices, such as direct memory access (DMA) bus masters, increase the complexity of accessing memory. To improve memory access performance in a multiprocessor system, local or private data caches are generally used to hold data that is shared between the processors. The sharing of data among multiple processors and by memory access agents, such as the DMA bus masters, causes a cache coherency problem. For example, without control over cache coherency, memory operations, which may be interleaved between the multiple processors and memory agents, may cause copies of shared data in one or more caches to become out of date. To resolve the cache coherency problem, various forms of coherency protocols are used to maintain an ordered use of shared data.

One technique for maintaining coherency involves processors monitoring bus traffic, also termed "snooping", for writes to the memory system. Snoop monitoring requires a processor to capture the memory address of a write operation and then request a local cache access at the captured memory address to see if shared data is in the local cache. If shared data is found in the local cache, the snooping processor invalidates its copy of the shared data since it would be out of date due to the detected write operation. If shared data is not found in the local cache, no further operation is taken. In either case, the snoop operation accesses the local cache and thereby reduces the effective bandwidth of the cache. In a multiprocessing system, snooping activity increases as the number of processors sharing memory increases and the resulting cache access for each snoop operation can significantly impact the performance of the multiprocessor system.

SUMMARY

Among its several aspects, the present disclosure recognizes that providing more efficient methods and apparatuses for controlling cache coherency can improve performance and reduce power requirements in a processor system. To such ends, an embodiment of the invention addresses a method for tracking a potential invalidation of a data cache entry in a data cache for which coherency is required. Coherency information is received that indicates a potential invalidation of a data cache entry. The coherency information in association with the data cache entry is retained to track the potential invalidation to the data cache entry, wherein the retained coherency information is kept separate from state bits that are utilized in cache access operations.

Another embodiment addresses an apparatus for low intrusion snoop invalidate. The apparatus may suitably include a data cache, an array of invalidate bits, and control circuitry. The data cache has a plurality of entries and a plurality of valid bits associated with the plurality of data cache entries, the plurality of valid bits being utilized in cache access operations. The array of invalidate bits are kept separate from the plurality of valid bits. The control circuitry is configured to receive coherency information associated with a data cache entry. Additionally, the control circuitry is configured to set an invalidate bit in the array of invalidate bits, in response to the coherency information, wherein the invalidate bit associated with the data cache entry. Furthermore, the control circuitry is configured to clear a valid bit in response to the set invalidate bit, and to clear the invalidate bit after the valid bit had been cleared.

Another embodiment addresses a method for low intrusion snoop invalidation of a data cache entry in a data cache for which coherency is required. Coherency information associated with a data cache entry is received. An invalidate bit associated with the data cache entry is set in response to the coherency information. A valid bit associated with the data cache entry is cleared in response to the set invalidate bit and a memory synchronization command. The set invalidate bit is cleared after the valid bit has been cleared.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
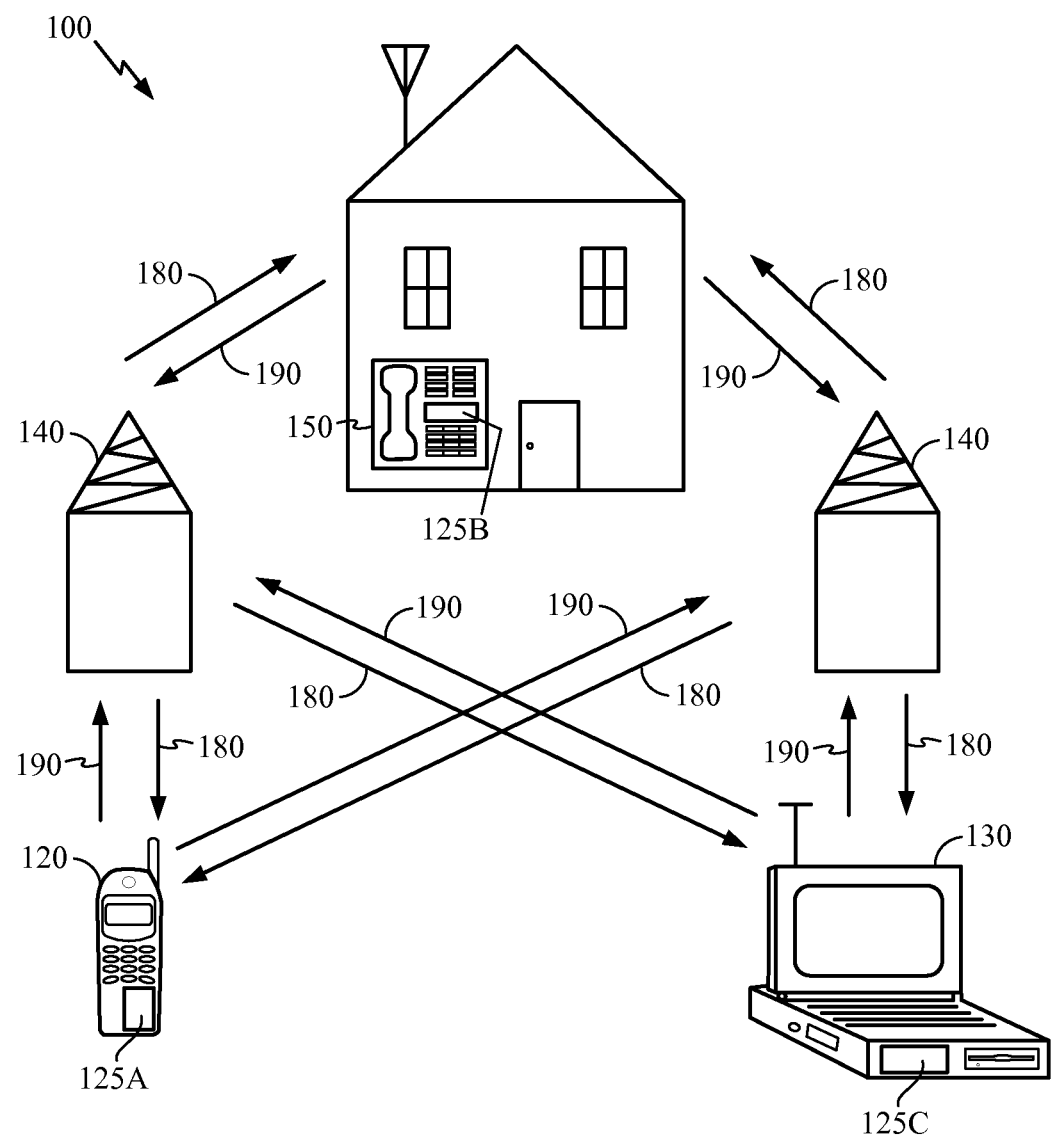
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having a shared memory multiprocessing system using a weakly ordered memory coherency protocol.

Figure 2:
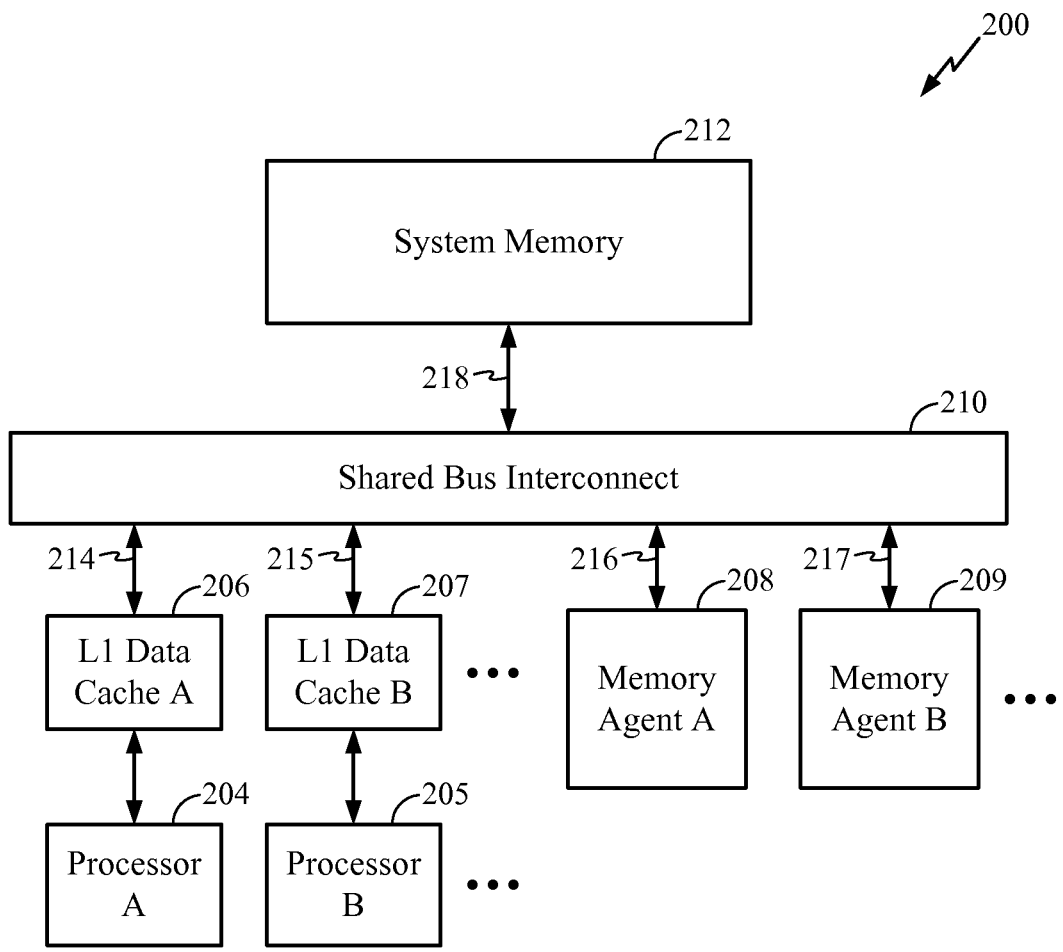
FIG. 2 shows an exemplary multiprocessing system with a plurality of processors and memory agents coupled together on a shared bus.

FIG. 2 shows an exemplary multiprocessing system 200 with a plurality of processors and memory agents coupled together on a shared bus which may suitably be employed in components 125A, 125C, 125B, and 125D of FIG. 1. The multiprocessing system 200 includes processors 204 and 205, level 1 data caches (L1 D-caches) 206 and 207, memory agents 208 and 209, a shared bus interconnect 210, and system memory 212. Instruction caches for the processors 204 and 205 are not shown for reasons of clarity in showing data paths and exemplary data caches in accordance with the present invention. The L1 D-caches 206 and 207 may use write through caching. The system memory 212 may also consist of a hierarchy of memory devices, such as a level 2 cache, a level 3 cache, bulk memory, and the like. A write to a write through data cache causes the data to also be written to the next level memory. The actual number of processors and memory agents required for a particular application may vary depending upon processing requirements and design constraints.

The shared bus interconnect 210 manages bus traffic and provides connection paths between one or more processors, memory agents, and memory. A memory agent may be a memory controller, a bridge device for interconnecting to another bus interconnect device, a peripheral device such as a hard disk controller, a universal serial bus (USB) controller, an interactive display device, a radio device coupling a controller to a transmitter and receiver, or the like. The memory agent may be a bus master utilizing direct memory access (DMA) techniques for reading or writing data to memory. The processors 204 and 205, the memory agents 208 and 209, and the shared bus interconnect 210 may be implemented using application specific integrated circuit (ASIC) technology, field programmable gate array (FPGA) technology, or other programmable logic, discrete gate or transistor logic, or any other available technology suitable for an intended application.

The processor 204, for example, may be configured to execute instructions under control of a program stored on a computer readable storage medium either directly associated locally with the processor, such as may be available through an instruction cache, or accessible through the shared bus interconnect 210 from a memory agent. The memory agents also may access data residing in a memory device either directly associated locally with one of the processors, such as the L1 D-cache 206, or accessible through the shared bus interconnect from another processor memory device or memory agent. The storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

The shared bus interconnect 210 is illustrated in a general form with bidirectional interfaces 214-218 which may include write data, address, and read data busses and associated control signals. In many systems, a combined write and read data bus may be used. Generally, the separate address, read data, and write data busses conform to a particular bus architecture, or standard, depending upon the requirements of a particular system. Commands, such as memory barrier commands, snoop operations, and data may be communicated across one or more of the bidirectional interfaces 214-217. The bidirectional interfaces 214-218 are typically buffered to support flow control and variation in bus traffic between multiple devices.

The processors and memory agents in a multi-processor system may at times require ordered transactions for reading and writing data that go across the various system interconnect buses to a shared memory facility. Many of the read and write operations to memory require that the read and write transactions be completed in the same order they are initiated. It is noted that while this ordering relationship is maintained, running unrelated read and write transactions out of order may yield performance benefits. As a consequence, a weakly-ordered memory coherency model may be used. The weakly-ordered memory coherency model allows relaxation of, for example, write-to-read, write-to-write, read-to-read, and read-to-write program order.

This need for both ordered and unordered transactions has led some architectures to use memory synchronization commands, such as, a fence or memory barrier operation for forcing ordered transactions when needed. As used herein, a memory barrier command causes a general operation that enforces order between transactions to shared memory. For example, the memory barrier command ensures that all outstanding explicit memory accesses issued prior to a memory barrier command are complete before any following memory transactions begin.

Figure 3:
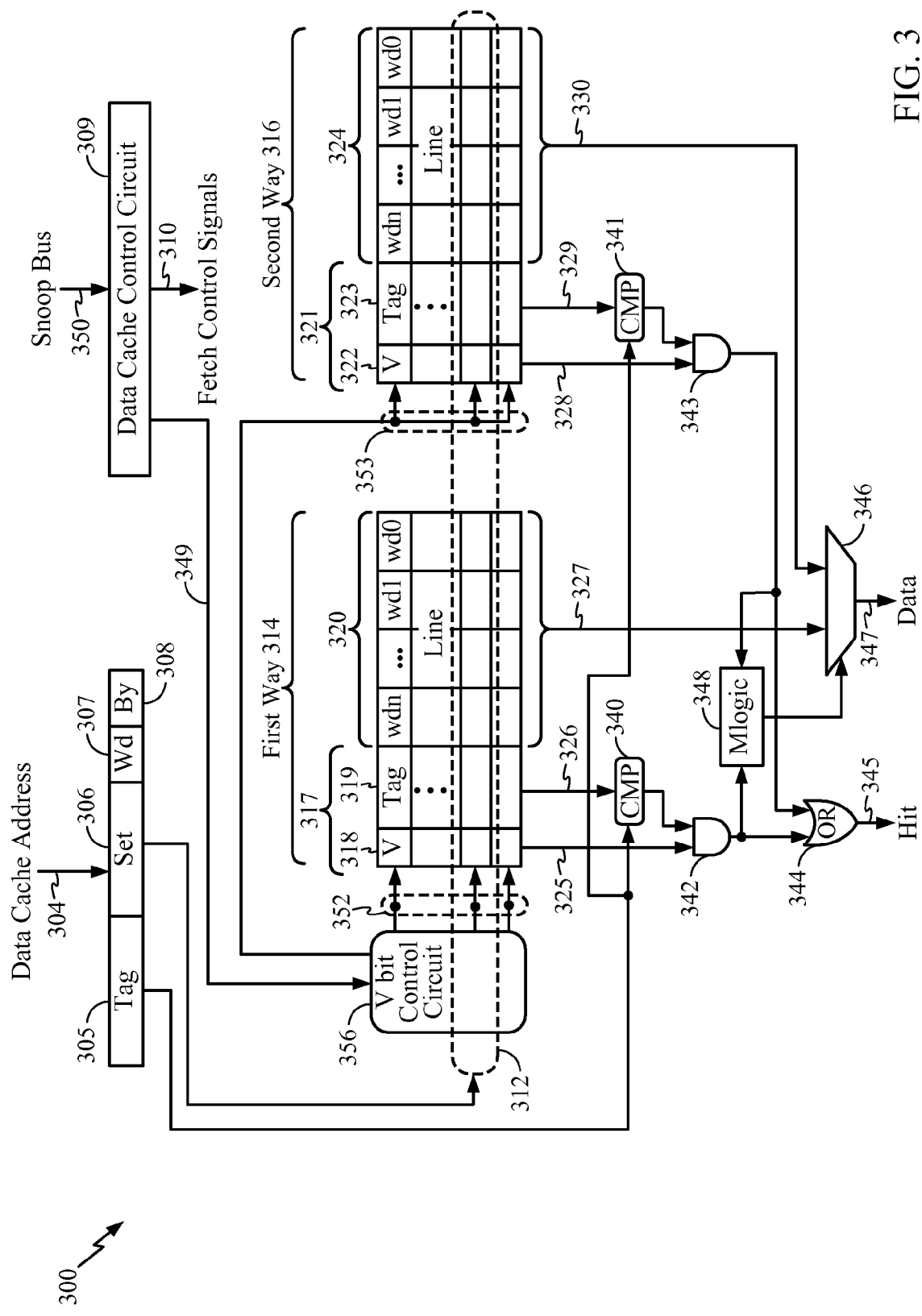
FIG. 3 illustrates an exemplary first data cache circuit having a valid bit control circuit coupled to data sets in a level 1 data cache.

FIG. 3 illustrates an exemplary first data cache circuit 300 having a valid bit control circuit coupled to data sets in a level 1 data cache, such as L1 D-cache 206. While the invention is applicable to other cache designs such as a direct mapped cache, a four way, an eight way, or larger set associative caches, a two way set associative data cache is shown as the exemplary first data cache circuit 300. The first data cache circuit 300 comprises storage for a first way 314 having a first set of state bits 317, such as valid (V) bits 318 and address tags 319, and lines of data 320 partitioned into "n+1" words, wdn-wd0. The first data cache circuit 300 also comprises storage for a second way 316 having a second set of state bits 321, such as valid (V) bits 322 and address tags 323, and lines of data 324, also partitioned into "n+1" words, wdn-wd0. The state bits 317 and 321 are utilized in cache access operations. State bits 317 and 321 are recognized as any non-lines of data bits. The manner in which the data cache is actually implemented depends on the particular application and the design constraints imposed on the overall system. Those skilled in the art will recognize the interchangeability of various designs, and how best to implement the functionality described herein for each particular application. For example, while the address tag and V bit arrays are shown associated with their corresponding line array, the address tag and V bit arrays may be implemented in one array and the line arrays separately implemented.

During a data fetch operation in the first data cache circuit 300, an address of a data element is provided on a data cache address 304. The address is partitioned into an address tag field 305, a set field 306, a word (Wd) field 307, and a byte (By) field 308. A data cache control circuit 309 generates fetch control signals 310 to control various operations in the data cache. For example, the set field 306 is used to select a set, such as set 312, that encompasses a particular V bit, address tag, and line of data for each way 314 and 316 in the data cache. For the data fetch operation, the V bit outputs 325 and 328, the address tag outputs 326 and 329, line of data outputs 327 and 330 at the set address for both ways 314 and 316, respectively, are read out of the data cache. An address tag compare is done in compare circuits 340 and 341 comparing the cached address tag fields with the address tag field 305. The output of the compare circuits 340 and 341 are AND'ed, for example, in AND gates 342 and 343 with each ways' valid bit. The output of the AND gates 342 and 343 are OR'd in OR gate 344 which outputs a "hit" indication 345 if a tag match is found. Upon a "hit", a selection is made in multiplexer 346 to select the line of data outputs 327 or 330 associated with the match indication and outputs the line of data on multiplexer output 347 as selected by multiplexer logic (Mlogic) 348.

One technique for maintaining coherency in the multiprocessing system 200 involves processors monitoring bus traffic, also termed "snooping", for writes to the memory system. Snoop monitoring requires a processor to capture the memory address of a write operation and then request a local cache access at the captured memory address to see if shared data is in the local cache. For example, a snoop invalidate signal and a write data address may be provided on a snoop bus 350 or a separate bus and received in data cache control circuit 309. For snoop operations, the write data address may take the form of the data cache address 304 having one or more of the address tag field 305, the set field 306, the Wd field 307, and the By field 308 partitions. The data cache control circuit 309 generally causes a cache access, in a manner similar to a fetch operation described above, to determine whether a shared data element is located in the data cache. The data cache control circuit 309 is coupled over control bus 349 to a V bit control circuit 356 which controls the setting and resetting of the V bits 318 and 322 directly associated with sets of data in the data cache. If shared data is found in the local cache, the valid bit for the appropriate line is set to an invalid state to invalidate its copy of the shared data, since it would be out of date due to the detected write operation. For example, invalidate signals 352 and 353 would be selectively set by the V bit control circuit 356 to invalidate the V bit associated with the appropriate line of shared data in the data cache. If shared data is not found in the local cache, no further operation is taken.

Figure 4:
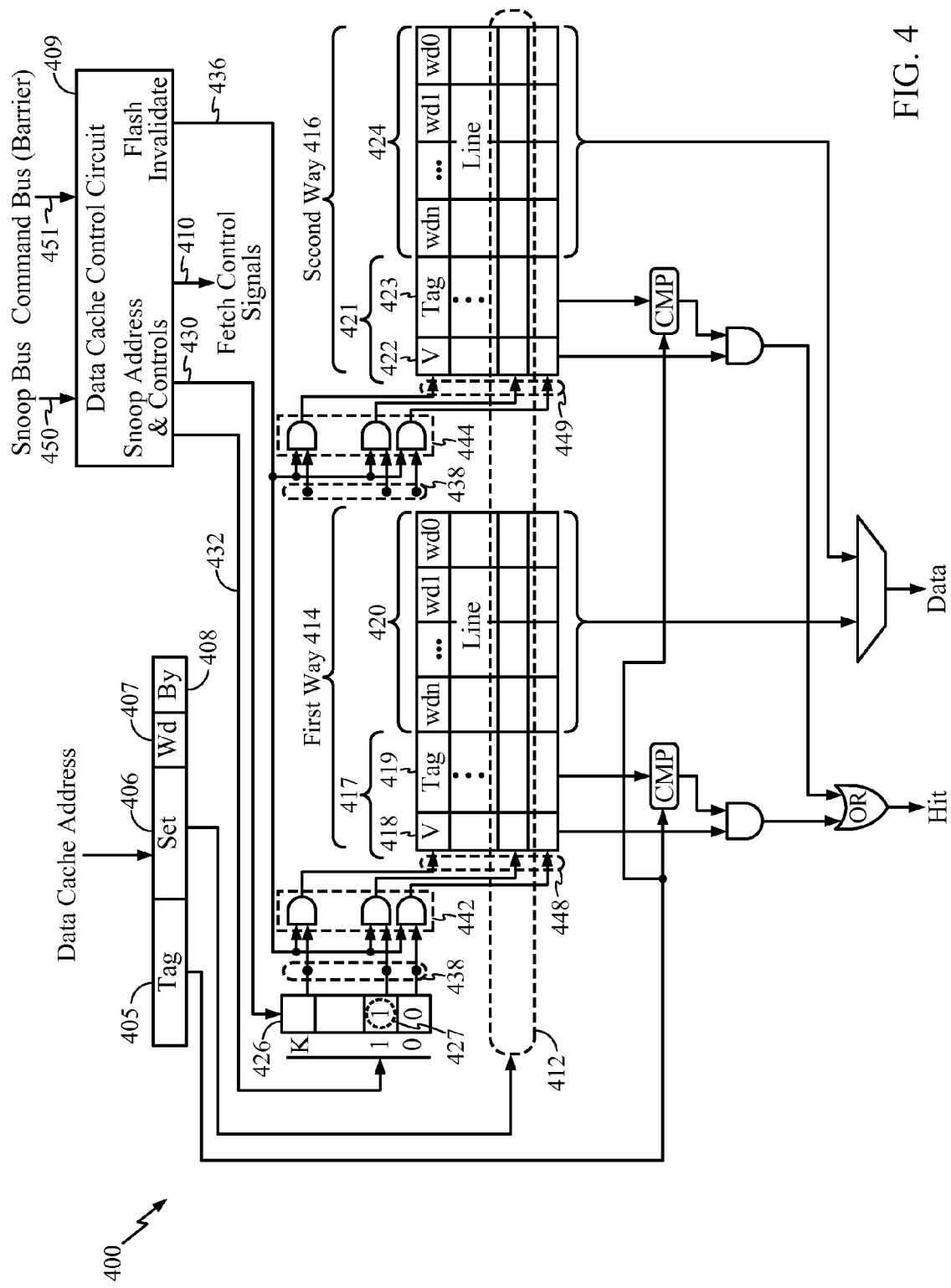
FIG. 4 illustrates an exemplary second data cache circuit having snoop invalidate bits coupled to data sets in a level 1 data cache.

FIG. 4 illustrates an exemplary second data cache circuit 400 having snoop invalidate bits coupled to data sets in a level 1 data cache. The second data cache circuit 400 is a two way set associative data cache. The second data cache circuit 400 comprises storage for a first way 414 having a first set of state bits 417, such as valid (V) bits 418 and address tags 419, and lines of data 420 partitioned into "n+1" words, wdn-wd0 and storage for a second way 416 having a second set of state bits 421, such as V bits 422 and address tags 423, and lines of data 424, also partitioned into "n+1" words, wdn-wd0. The state bits 417 and 421 bits are utilized in cache access operations. The second data cache circuit 400 also includes a snoop array 426 that stores invalidate bits associated with data cache entries. Snoop invalidate bits 438 are output from the snoop array 426 and ANDed in AND gate arrays 442 and 444. The outputs of the AND gate arrays 442 and 444 are invalidate signals 448 and 449 which control the clearing of the valid bits 418 and 422, respectively, as described in more detail below. A snoop invalidate signal and a write data address may be provided on a snoop bus 450 and a barrier command may be received on a command bus 451 in data cache control circuit 409. A data cache address is partitioned in an address tag 405, a set 406, a word (Wd) 407, and a byte (By) 408.

In the multiprocessor system 200 of FIG. 2, snoop operations to the local data cache, as described above with regard to FIG. 3, may become numerous which may result in reducing the effective bandwidth of the data cache and increasing energy consumption. With the multiprocessor system 200 operating with a weakly-ordered memory coherency mechanism, stores are not guaranteed to be "observed" by other processors or memory agents until the originating processor performs a synchronizing operation, such as a memory barrier operation. In such as weakly-ordered memory coherency system, the invalidating of targeted lines in a cache in other processors may be delayed until a barrier operation occurs.

Conventional multiprocessor cache systems using weakly-ordered memory coherency cause cache accesses on each snoop invalidate signal received. A second data cache circuit 400 which may be deployed in a weakly-ordered memory coherency system stores an indication that a snoop invalidate signal occurred. The indication is stored in a snoop invalidate bit array, such as snoop array 426, that is separate from the state bits 417 and 421 that are utilized in cache access operations. For example, in the snoop array 426, the bits are arranged according to the cache set referred to by the snoop write address. A snoop invalidate bit stores an indication of receiving a snoop invalidate signal for a particular data cache entry and, as such, represents a potential invalidation of the data cache entry that is tracked and not lost. The data cache control circuit 409 generates snoop control signals 430 which set a bit in the snoop array 426 at a snoop write set address 432. For example, bit 427 may be set in the snoop array 426 at the set address specified by a snoop write address. The setting of a bit in the snoop array 426 does not interfere with normal cache accesses.

When a barrier instruction is executed on any processor, the other processors in the multiprocessor system flash invalidate data cache sets that have their associated snoop invalidate bit set. The data cache control circuit 409 receives a barrier command on command bus 451 and generates a flash invalidate signal 436 to be ANDed in AND gate arrays 442 and 444 with snoop invalidate bits 438 from the snoop array 426. The outputs of the AND gate arrays 442 and 444 are invalidate signals 448 and 449 which clear corresponding valid bits from the valid bits 418 and 422, respectively. After the flash invalidate operation on the valid bits 418 and 422, the snoop invalidate bits in the snoop array 426 are cleared. It is noted that the snoop array 426 may be cleared for other reasons, such as, during a reset of a processor associated with the data cache. Also, a particular bit in the snoop array 426 may be reset when the associated line in the data cache is allocated to another address. It is also noted that the invalidate signals may be individually ORed with one or more signals, for example, for setting the valid bits.

Figure 5:
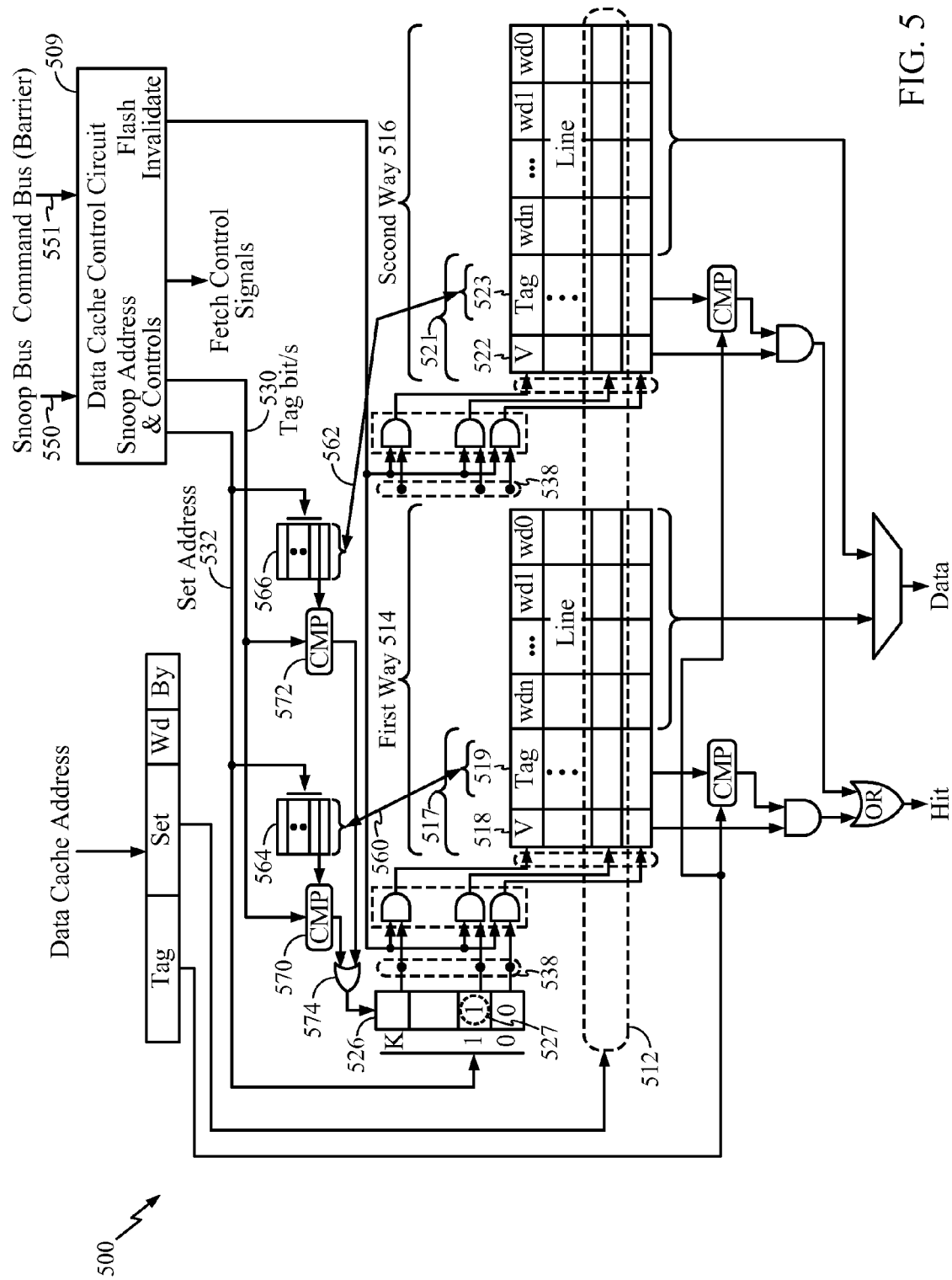
FIG. 5 illustrates an exemplary third data cache circuit having snoop invalidate bits coupled to data sets in a level 1 data cache.

FIG. 5 illustrates an exemplary third data cache circuit 500 having snoop invalidate bits coupled to data sets in a level 1 data cache. The third data cache circuit 500 is similar to the second data cache circuit 400 of FIG. 4, but with support for finer granularity for determining whether to set a snoop invalidate bit in a snoop array. State bits 517 include valid bits 518 and address tags 519 and state bits 521 include valid bits 522 and address tags 523. One or more bits of address tags 519 are duplicated over coupling 560 in a first duplicate tag bit array 564. Also, one or more bits of address tags 523 are duplicated over coupling 562 in a second duplicate tag bit array 566. When a snoop write operation occurs, the data cache control logic 509 generates a set address 532, associated with set 512, for example, in response to a snoop write set-address obtained from the snoop bus 550. The data cache control logic 509 also generates one or more tag address bits 530 corresponding to an address tag field of the snoop write address obtained from the snoop bus 550. The one or more address tag bit 530 are compared to the one or more address tag bits stored in the first and second duplicate tag bit arrays 564 and 566 to determine, with finer granularity, whether the snoop address is present in the data cache. For example, the one or more address tag bits 530 are compared with the one or more address tag bits selected from the duplicate tag bit arrays 564 and 566 at the set address 532 in comparators 570 and 572. By design choice, one address tag bit up to the full set of address tag bits may be compared. The results of the comparators 570 and 572 are OR'ed in OR gate 574 whose output is used to set an invalidate bit, such as invalidate bit 527 equal to "1", in the snoop array 526 at the set address 532.

When the data cache control logic 509 receives a barrier command on command bus 551, data cache sets that have their associated snoop invalidate bit set are flash invalidated in a manner similar to that described above with regard to FIG. 4. After the flash invalidate operation, the snoop invalidate bits in the snoop array 526 are cleared.

Figure 6:
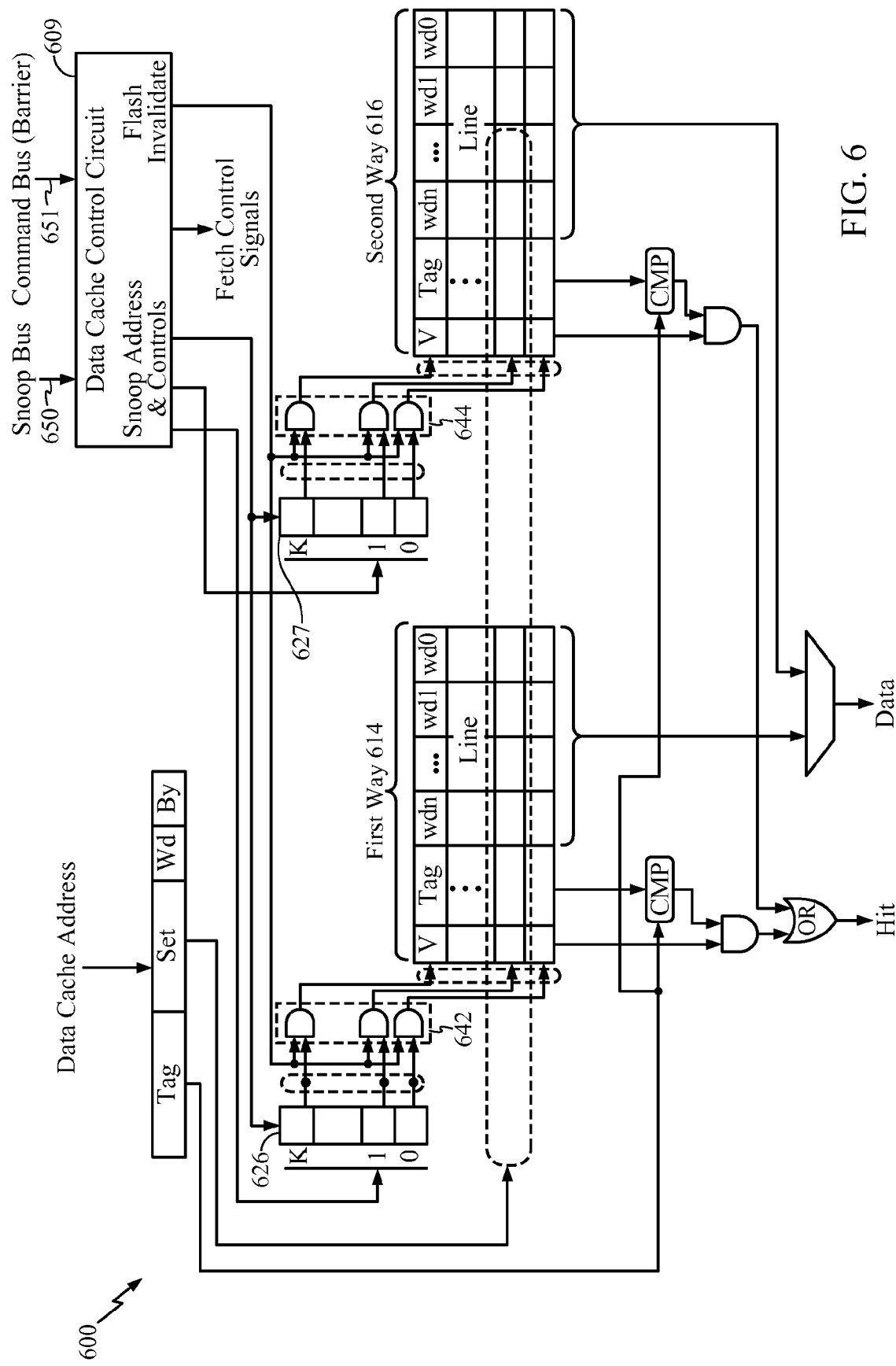
FIG. 6 illustrates an exemplary fourth data cache circuit having snoop invalidate bits coupled to a line in each way of a level 1 data cache.

FIG. 6 illustrates an exemplary fourth data cache circuit 600 having snoop invalidate bits coupled to a line in each way of a level 1 data cache. The fourth data cache circuit 600 is similar to the second data cache circuit 400 of FIG. 4, but with a snoop invalidate bit for each way in a cached set. For example, a snoop array 626 is used for a first way 614 of the two way set associative data cache and a snoop array 627 is used for a second way 616 of the two way set associative data cache. When a snoop invalidate signal and write data address is received on snoop bus 650 associated with a particular set in the data cache, the snoop invalidate bit or bits in each way associated with the set are driven to an active state. During processor operations, if a particular way in a set is allocated/replaced, then the snoop invalidate bit associated with that particular way is cleared. When the data cache control logic 609 receives a barrier command on command bus 651, data cache sets that have their associated snoop invalidate bit set are flash invalidated utilizing AND gates 642 and 644 in a manner similar to that described above with regard to FIG. 4. After the flash invalidate operation, the snoop invalidate bits in the snoop array 626 and 627 are cleared.

Figure 7:
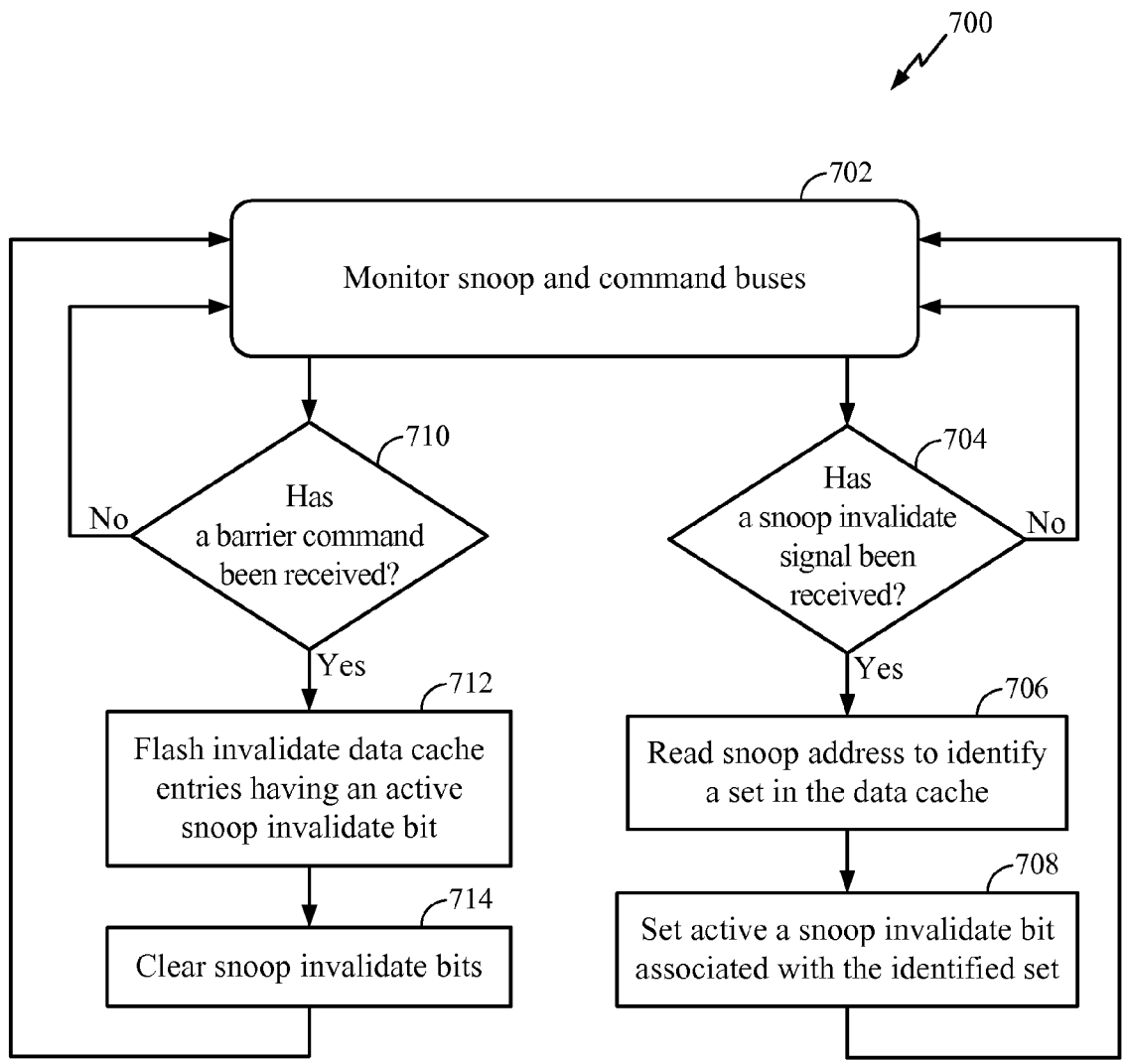
FIG. 7 illustrates a flowchart of a first snoop process to reduce snoop invalidates in a multiprocessor system.

FIG. 7 illustrates a flowchart of a first snoop process 700 to reduce snoop invalidates in a multiprocessor system. At block 702, the snoop bus and the command bus are monitored. At decision block 704, it is determined whether a snoop invalidate signal has been received. If a snoop invalidate signal has not been received, the first snoop process 700 returns to block 702 to continue to monitor the snoop and command buses. If a snoop invalidate has been received, the first snoop process 700 proceeds to block 706. At block 706, a snoop address is read to identify a set in the data cache. At block 708, a snoop invalidate bit is set, where the snoop invalidate bit is associated with the set in the data cache identified at block 706. The first snoop process 700 then returns to block 702 to continue to monitor the snoop and command buses.

At decision block 710, it is determined whether a barrier command has been received. If a barrier command has not been received, the first snoop process 700 returns to block 702 to continue to monitor the snoop and command buses. If a barrier command has been received, the first snoop process 700 proceeds to block 712. At block 712, data cache entries having an active snoop invalidate bit are flash invalidated. At block 714, the snoop invalidate bits are cleared and the first snoop process 700 then returns to block 702 to continue to monitor the snoop and command buses.

Figure 8:
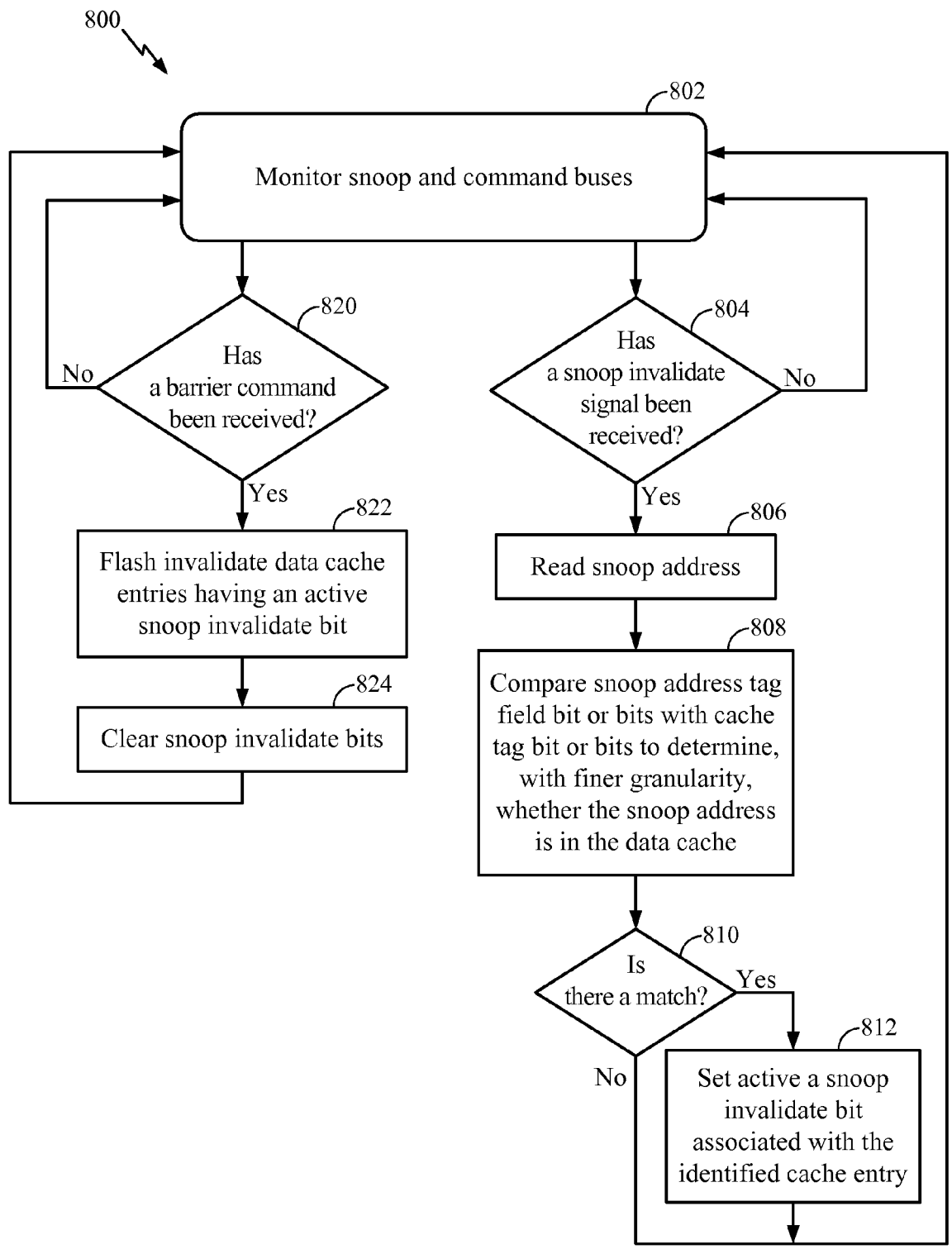
FIG. 8 illustrates a flowchart of a second snoop process to reduce snoop invalidates in a multiprocessor system.

FIG. 8 illustrates a flowchart of a second snoop process 800 to reduce snoop invalidates in a multiprocessor system. At block 802, the snoop bus and the command bus are monitored. At decision block 804, it is determined whether a snoop invalidate signal has been received. If a snoop invalidate signal has not been received, the second snoop process 800 returns to block 802 to continue to monitor the snoop and command buses. If a snoop invalidate has been received, the second snoop process 800 proceeds to block 806. At block 806, a snoop address is read. At block 808, the address tag field bit or bits of the snoop address read in block 806 are compared with a corresponding data cache tag bit or bits to determine, with finer granularity, whether the snoop address is in the data cache. At decision block 810, it is determined whether the compare of block 808 resulted in a match. If there was not a match, the second snoop process 800 returns to block 802 to continue to monitor the snoop and command buses. If there was a match, the second snoop process 800 proceeds to block 812. At block 812, a snoop invalidate bit is set, where the snoop invalidate bit is associated with the data cache entry identified by the compare operation at block 808. The second snoop process 800 then returns to block 802 to continue to monitor the snoop and command buses.

At decision block 820, it is determined whether a barrier command has been received. If a barrier command has not been received, the second snoop process 800 returns to block 802 to continue to monitor the snoop and command buses. If a barrier command has been received, the second snoop process 800 proceeds to block 822. At block 822, data cache entries having an active snoop invalidate bit are flash invalidated. At block 824, the snoop invalidate bits are cleared and the second snoop process 800 then returns to block 802 to continue to monitor the snoop and command buses.

It is noted that the methods and apparatus for low intrusion snoop invalidate may be used in conjunction with conventional snoop filters or snoop queues. By reducing the number of snoop invalidate operations, power efficiency of the multiprocessor system is improved.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of illustrative embodiments for instruction caches, data caches, and other types of caches, it will be recognized that a wide variety of implementations may be employed by persons of ordinary skill in the art consistent with the above discussion and the claims which follow below.

What is claimed is:

1. A method comprising:
   receiving at a data cache a snoop invalidate signal and a snoop write address, the data cache comprising a snoop array and a first way;
   reading the snoop write address to identify a data cache entry in the first way; and
   setting an invalidate bit in the snoop array to indicate receiving the snoop invalidate signal for the data cache entry,
   wherein the invalidate bit is distinct from a valid bit associated with the data cache entry.

2. The method of claim 1, wherein the data cache entry is located at a set address in the data cache, the set address being a portion of a memory address.

3. The method of claim 1, wherein the data cache entry is a line of data in the first way, wherein the data cache is a multi-way set associative data cache.

4. The method of claim 1, wherein the data cache including the data cache entry is configured to operate with a weakly ordered memory protocol.

5. The method of claim 1, wherein the data cache receives coherency information, where the coherency information comprises a snoop invalidate signal having an address associated with a write to memory operation.

6. The method of claim 1 further comprising:
   determining a result based on a comparison between a bit of an address tag field included in the snoop write address and a bit of an address tag stored in the data cache at a location, wherein the address tag field is associated with a write to memory operation;
   indicating a particular invalidation bit associated with the location is to be set in response to the result based on the comparison being a match result; and
   indicating the particular invalidation bit associated with the location is not to be set in response to the result based on the comparison being a no match result.

7. The method of claim 1, further comprising:
   receiving a memory synchronization command; and
   in response to the memory synchronization command:
   invalidating the data cache entry associated with the invalidate bit; and
   clearing the invalidate bit.

8. The method of claim 7, wherein the memory synchronization command is a barrier command.

9. The method of claim 7, wherein the invalidating the data cache entry comprises placing a valid bit associated with the data cache entry in an invalid state.

10. The method of claim 7, wherein setting the invalidate bit places the invalidate bit in an active state.

11. An apparatus comprising:
   a data cache having a first way to store a plurality of entries and a plurality of valid bits associated with the plurality of entries, the plurality of valid bits being utilized in cache access operations;
   a snoop array to store invalidate bits, wherein the snoop array is distinct from the first way; and
   control circuitry configured to:
   receive a snoop invalidate signal and a snoop write address;
   read the snoop write address to identify a data cache entry of the plurality of entries;
   set an invalidate bit in the snoop array in response to the snoop invalidate signal, wherein the invalidate bit is associated with the data cache entry; and
   in response to receiving a barrier command, invalidate all entries in the plurality of entries associated with an invalidate bit that has been set in the snoop array, and clearing the snoop array.

12. The apparatus of claim 11, wherein each entry is located at a set address of the data cache, wherein each set address is associated with a particular portion of a memory address.

13. The apparatus of claim 11, wherein the data cache is a multi-way set associative data cache and wherein each entry is a line of data in the first way.

14. The apparatus of claim 11, wherein the snoop invalidate signal and the snoop write address include weakly ordered memory coherency information.

15. The apparatus of claim 11, further comprising:
   a comparator configured to perform a comparison of at least one bit in an address tag field included in the snoop address and at least one bit of an address tag stored in the data cache at a location, wherein the control circuitry sets a particular invalidate bit in the snoop array associated with the location in response to the comparison result in a match.

16. The apparatus of claim 11, wherein the data cache is a write through data cache.

17. A non-transitory computer readable storage medium having instructions that when executed by a processor cause the processor to perform a method comprising:

receiving at a data cache a snoop invalidate signal and a snoop write address, the data cache comprising a snoop array and a first way;

reading the snoop write address to identify a data cache entry in the first way; and setting an invalidate bit in the snoop array to indicate receiving the snoop invalidate signal for the data cache entry, wherein the invalidate bit is distinct from a valid bit associated with the data cache entry.

18. The non-transitory computer readable storage medium of claim 17, wherein the data cache entry is located at a set address in the data cache, the set address being a portion of a memory address.

19. The non-transitory computer readable storage medium of claim 17, wherein the data cache entry is a line of data in the first way, wherein the data cache is a multi-way set associative data cache.

20. The non-transitory computer readable storage medium of claim 17, wherein the data cache including the data cache entry is configured to operate with a weakly ordered memory protocol.

* * * * *